United States Patent [19]

Nakamura

[11] 4,447,672
[45] May 8, 1984

[54] DEVICE FOR ENCRYPTING EACH INPUT DATA BIT BY AT LEAST ONE KEYING BIT DECIDED BY A CODE PATTERN AND A BIT PATTERN OF A PREDETERMINED NUMBER OF PRECEDING ENCRYPTED BITS

[75] Inventor: Katsuhiro Nakamura, Tokyo, Japan
[73] Assignee: Nippon Electric Co., Ltd., Tokyo, Japan
[21] Appl. No.: 308,244
[22] Filed: Oct. 2, 1981

[30] Foreign Application Priority Data

Oct. 6, 1980 [JP] Japan ................... 55-139596
Mar. 11, 1981 [JP] Japan ................... 56-34890

[51] Int. Cl.³ ............................................. H04L 9/00
[52] U.S. Cl. ............................ 178/22.19; 178/22.13; 178/22.16
[58] Field of Search ............... 178/22.12, 22.13, 22.16, 178/22.19

[56] References Cited

U.S. PATENT DOCUMENTS

| Re. 30,957 | 6/1982 | Feistel | 178/22.19 |
|---|---|---|---|
| 3,639,690 | 2/1972 | Braun et al. | 178/22.19 |
| 3,678,198 | 7/1972 | Ehrat | 178/22.13 |
| 3,784,743 | 1/1974 | Schroeder | 178/22.12 |
| 3,796,830 | 5/1974 | Smith | 178/22.12 |
| 3,920,894 | 11/1975 | Shirley et al. | 178/22.12 |
| 4,157,454 | 6/1979 | Becker | 178/22.12 |
| 4,172,213 | 10/1979 | Burnes et al. | 178/22.19 |
| 4,187,392 | 2/1980 | Safford | 178/22.16 |
| 4,211,891 | 6/1980 | Glitz | 178/22.19 |
| 4,304,962 | 12/1981 | Fracassi et al. | 178/22.19 |

*Primary Examiner*—Sal Cangialosi
*Attorney, Agent, or Firm*—Laff, Whitesel, Conte & Saret

[57] ABSTRACT

An encrypting device for an input data bit sequence comprises a shift register for producing a bit pattern represented by successive encrypted bits for the data bits preceding a current bit. A bit pattern converter selects in compliance with the bit pattern a bit of a code pattern preset therein. A keying bit may be provided by the selected bit, to which the current bit is added modulo two to produce a new encrypted bit. For more excellent encryption, the successively selected bits may be used to produce an additional bit pattern, responsive to which either the keying bit or an additional keying bit, to be also added to the current bit, may be provided by a selected bit of another code pattern. Each bit pattern converter may be preset with a plurality of code patterns. One or more encrypting devices may be used in encrypting a sequence of input data digits, each comprising a plurality of input data bits among which at least one bit may be a dummy bit. A decrypting device should have a structure corresponding to the counterpart encrypting device.

24 Claims, 9 Drawing Figures

DEVICE FOR ENCRYPTING EACH INPUT DATA BIT BY AT LEAST ONE KEYING BIT DECIDED BY A CODE PATTERN AND A BIT PATTERN OF A PREDETERMINED NUMBER OF PRECEDING ENCRYPTED BITS

BACKGROUND OF THE INVENTION

This invention relates to an encrypting device for use either in transmitting or recording a digital signal, such as a PCM signal, with each digit encrypted. This invention relates also to a decrypting device for use in combination with the encrypting device.

It is possible to provide an excellent encrypting and decrypting system by the use of algorithms released, Jan. 15, 1977 as FIPS PUB (Federal Information Processing Standards Publication) 46 by the National Bureau of Standards of the United States Department of Commerce (hereafter called the DES algorithm). Sixteen iterations of a calculation are, however, necessary on encrypting sixty-four-bit input data into sixty-four-bit encrypted data with the iterations preceded by an initial permutation and followed by the inverse of the initial permutation. The encrypted data are therefore obtained with an appreciable delay. In addition, synchronism must be kept for the sixty-four bits.

An encrypting and decrypting system revealed in U.S. Pat. No. 4,172,213 issued to Vera L. Barnes et al, assignors to Burroughs Corporation, makes use of a DES chip, namely, a chip for the DES algorithm. Consequently, the system according to Barnes et al is not devoid of the inconveniences inherent to the DES algorithm.

It is possible to provide an encrypting and decrypting system by resorting to the scrambling and descrambling technique, in which a maximal-length sequence generator is used. An example is disclosed in an article contributed by J. E. Savage to "The Bell System Technical Journal," Vol. XLVI, No. 2 (February 1969), pages 449–487, under the title of "Some Simple Self-Synchronizing Digital Data Scramblers." Only a few number of keys are, however, available for encryption and decryption. Furthermore, deciphering is possible even for an unauthorized recipient by analyzing a relatively small number of encrypted bits, such as 2m bits, where m represents the number of stages of a shift register used in the maximal-length sequence generator.

SUMMARY OF THE INVENTION

It is therefore an object of the present invention to provide an encrypting device, by which input data digits are encrypted with a least possible delay.

It is another object of this invention to provide an encrypting device of the type described, for which no spurious digits are necessary for synchronization.

It is still another object of this invention to provide an encrypting device of the type described, to which a great number of keys are available for encryption and decryption.

It is yet another object of this invention to provide an encrypting device of the type described, with which it is possible to produce an encrypted digit sequence that is difficult for an unauthorized recipient to decrypt or decipher.

It is a further object of this invention to provide a decrypting device for use as a counterpart of such an encrypting device.

According to this invention, there is provided an encrypting device for encrypting a sequence of input data bits into a sequence of encrypted bits in response to a sequence of clock pulses timing the input data bits and the encrypted bits with a predetermined clock period. A memory means is responsive to the clock pulses for memorizing a predetermined number m of the encrypted bits during each clock period to produce a memory output bit pattern represented by the m encrypted bits memorized therein. A bit pattern converting means is responsive to at least one code pattern for converting the memory output bit pattern to at least one keying bit. A modulo-two adding means calculates a sum modulo two of each input data bit and at least one keying bit to produce the sequence of encrypted bits. Each encrypted bit is given by the sum.

Preferably, at least one code pattern comprises binary bits, equal in number to $2^m$.

According to an embodiment of this invention, at least one code pattern is at least two in number and is given by a unit code pattern and at least one additional code pattern. The above-mentioned bit pattern converting means comprises a unit bit pattern converter for keeping the unit code pattern and for producing a converted bit responsive to the memory output bit pattern. A modulo-two adder calculates a sum modulo two of the converted bit and the encrypted bit produced by the adding means during each of the above-described clock periods to produce a sum bit given by the sum calculated by the adder. A shift register means is responsive to the clock pulses supplied thereto as shift pulses for retaining, during each clock period, a prescribed number of the sum bits which are successively produced by the adder, to produce a shift register bit pattern represented by the sum bits retained therein. An additional bit pattern converting means is responsive to at least one additional code pattern for converting the shift register bit pattern to at least one keying bit.

When viewed differently, an encrypting device according to the above-described embodiment is an encrypting device comprising modulo-two adding means for calculating a first sum modulo two of each encrypted bit and an adding means input bit and a second sum modulo two of each input data bit and at least one keying bit to produce a sum bit given by the first sum and the sequence of encrypted bits with each encrypted bit given by the second sum. A shift register means is responsive to the clock pulses supplied thereto as shift pulses for retaining, during each clock period, a predetermined number m of the encrypted bits and a prescribed number m' of the sum bits successively produced by the adding means to produce a unit and an additional shift register bit pattern represented by the m encrypted bits retained therein and the m' sum bits retained therein, respectively. A bit pattern converting means is responsive to a unit code pattern for converting the unit shift register bit pattern to a unit converted bit and responsive to at least one additional code pattern for converting the additional shift register bit pattern to at least one additional converted bit, and means for supplying the unit and at least one additional converted bits to the adding means as the adding means input bit and the at least one keying bit, respectively.

It is now readily possible to use one or more encrypting devices of the type described, for encryption of an input data digit sequence, where each digit is given by a plurality of parallel and/or series input data bits. Such an input data digit sequence is readily obtained by the use of a dummy bit even from a more general input data digit sequence having three or a like number of levels.

According to an aspect of this invention, there is provided an encrypting device for encrypting a sequence of input data digit into a sequence of encrypted digits in response to a sequence of clock pulses timing the input data digits and the encrypted digits with a predetermined clock period. Each input data digit comprises a first and a second input data bit. Each encrypted digit comprises a first and a second encrypted bit. The device according to this aspect of this invention comprises modulo-two adding means for calculating a first sum modulo two of each first input data bit and at least one keying bit to produce a sequence of the first encrypted bits with each first encrypted bit given by the first sum, a second sum modulo two of each second input data bit, the at least one keying bit, each first encrypted bit, and a first and a second adding means input bit to produce a sequence of the second encrypted bits with each second encrypted bit given by the second sum, and a third and a fourth sum modulo two of each first encrypted bit and the first and the second adding means input bits to produce a first and a second adding means output bit given by the third and the fourth sums, respectively, shift register means responsive to the clock pulses supplied thereto as shift pulses for retaining, during each clock period, a predetermined number m of the second encrypted bits, a first prescribed number $m_1$ of the first adding means output bits successively produced by the adding means, and a second prescribed number $m_2$ of the second adding means output bits successively produced by the adding means to produce a unit and a first and a second additional shift register bit pattern represented by the m second encrypted bits and the $m_1$ first and the $m_2$ second adding means output bits retained therein, respectively, bit pattern converting means responsive to a unit and a first and at least one second additional code pattern for converting the unit and the first and the second additional shift register bit patterns to a unit and a first and at least one second additional converted bit, respectively, and means for supplying the unit and the first and the at least one second additional converted bits to the adding means as the first and the second adding means input bits and the at least one keying bit, respectively.

According to this invention, there is also provided a decrypting device for decrypting the encrypted bit or digit sequence produced by the encrypting device of the type described, into a sequence of decrypted bits or digits by the use of a sequence of local clock pulses of the predetermined clock period.

DESCRIPTION OF THE PREFERRED EMBODIMENTS

Figure 1:
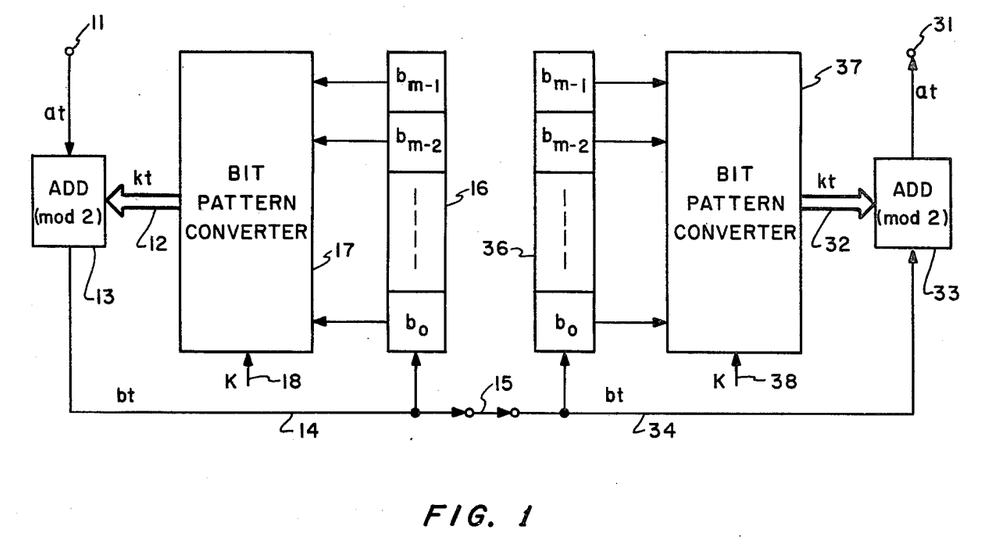
FIG. 1 shows in blocks an encrypting device according to a first embodiment of the instant invention together with a decrypting device for use in combination with the encrypting device to form an encrypting and decrypting system.

Referring to FIG. 1, an encrypting device according to a first embodiment of the present invention is for encrypting a sequence of input data bits into a sequence of original encrypted bits in response to a sequence of encryption clock pulses of a predetermined encryption clock period. Each of the input data bits and the encrypted bits is capable of taking either of binary zero and one at each clock period. When desired, the input data bit and the original encrypted bit at each clock period t, will be designated by $a_t$ and $b_t$, respectively. The input data bit sequence and the original encrypted bit sequence will be denoted by $\{a_t\}$ and $\{b_t\}$, respectively.

A device input terminal 11 is supplied with the input data bit sequence. A feedback line 12 is supplied with a preselected number s of sequences of encryption keying bits as will presently be described. Unity may be selected as the preselected number. When two is selected as the preselected number, the feedback line 12 is substantially simultaneously supplied with two keying bits of the respective sequences during each clock period. Such one or more keying bits will collectively be denoted by $k_t$. An encryption adder 13 is for calculating a sum modulo two of each input data bit $a_t$ supplied from the input terminal 11 and the one or more keying bits $k_t$ concurrently supplied from the feedback line 12. The modulus of two is used, irrespective of the preselected number. The adder 13 produces the encrypted bit sequence, with each encrypted bit $b_t$ given by the sum. The encrypted bit sequence is delivered to a device output line 14 and thence to a transmission line 15. Alternatively, the encrypted bit sequence may be supplied to a recording medium, as of a magnetic disk or drum, to be recorded thereon.

The encrypted bit sequence is supplied also to an input terminal of an encryption shift register 16 having a predetermined number m of stages. The shift register stages will be named first through (m−1)-th and m-th encryption stages as counted from the encryption stage having the shift register input terminal. Each shift register stage has a stage output terminal. The clock pulses are used as shift pulses for the shift register 16. During each clock period, the shift register 16 simultaneously produces the contents of the respective stages, namely, a set of m successive encrypted bits memorized in the respective stages, as first through (m−1)-th and m-th encryption output signals. In other words, the shift register 16 distributes the encrypted bit sequence into m parallel sequences of the encrypted bits.

As will become clear as the description proceeds, it is possible to define an encryption memory output bit pattern by each set of the first through the m-th output signals simultaneously produced by the shift register 16. The parallel encrypted bit sequences are indicative of a sequence of successive encryption memory output bit patterns. The memory output bit pattern may be defined by the first through the m-th output signals arranged according to the ordinal numbers, such as from the first to the m-th output signals. For such a predetermined permutation of the memorized bits, the greatest possible number, designated by M, of different memory output bit patterns amounts to $2^m$. In any event, it is possible to discriminate the memory output bit patterns from one another by a plurality of indices, M in number, allotted to the different memory output bit patterns, respectively.

An encryption bit pattern converter 17 is peliminarily supplied with at least one code pattern, s in number, to keep the at least one code pattern. The code pattern or patterns, collectively designated by K, are preset in the bit pattern converter 17 either manually or otherwise as symbolically indicated by a pattern lead 18. Each code pattern is for specifying an encryption keying bit according to each memory output bit pattern or each index. It is therefore possible to understand that each code pattern defines a feedback function. The same keying bit may be specified by different ones of the memory output bit patterns. Responsive to the successive memory output bit patterns, the bit pattern converter 17 supplies the feedback line 12 with the s keying bit or bits depending on each memory ouput bit pattern or each index and the s preset code patterns K. It is readily possible to implement such a bit pattern converter either by a read-only memory usually abbreviated to ROM in the art or a microprocessor.

By way of example, let each encryption memory output bit pattern define a binary number i by:

$$i = b_0 + b_1 \cdot 2 + b_2 \cdot 2^2 + \ldots + b_{m-1} \cdot 2^{m-1},$$

where $b_0, b_1, \ldots,$ and $b_{m-1}$ are representative of the first through the m-th encryption output signals, namely, the original encrypted bits produced during a certain encryption clock period from the first through the m-th encryption shift register stages, respectively. The binary number is variable between zero and $(2^m - 1)$, both inclusive. It is possible to decide the indices by index numbers j's equal to one plus the respective binary numbers i's. The index number is variable between one and $2^m$ or M. It is unnecessary that the indices be identified by such natural numbers.

It is preferred that each code pattern consists of first through M-th code pattern bits of a pattern length equal to the greatest possible number M. When the index takes an index number j, the bit pattern converter 17 may produce the j-th bit of each code pattern as an encryption keying bit.

For instance, let first and second unit code patterns $K_1$ and $K_2$ preset in the bit pattern converter 17 be:

$$K_1 = (01100110)$$

and $$K_2 = (00001111),$$

assuming that the predetermined number m is three for brevity of description. When the predetermined permutation of the memorized bits of the encrypted bit sequence is (000) to render the index number j equal to unity, the keying bits are two first bits of the respective unit code patterns, namely, 0 and 0. When the predetermined permutation is (100) to make the index number j take a value of two, the keying bits are two second bits 1 and 0. When the predetermined permutation is (111) to make the index number j give eight, the keying bits are two eighth bits 0 and 1.

More in general, let first through s-th unit code patterns $K_1$ through $K_s$ of such a pattern length M be:

$$K_1 = (k_0^1, k_1^1, \ldots, k_{M-1}^1),$$

$$K_2 = (k_0^2, k_1^2, \ldots, k_{M-1}^2),$$

$$\ldots, \text{ and}$$

$$K_s = (k_0^s, k_1^s, \ldots, k_{M-1}^s),$$

where each of $k_0^1, k_1^1, \ldots,$ and $k_{M-1}^s$ represents a code pattern bit of either binary zero or binary one. On the other hand, a single code pattern K of the pattern length M will be considered, which is given by:

$$K = \{(k_0^1 \oplus k_0^2 \oplus \ldots \oplus k_0^s),$$

$$(k_1^1 \oplus k_1^2 \oplus \ldots \oplus k_1^s), \ldots,$$

$$(k_{M-1}^1 \oplus k_{M-1}^2 \oplus \ldots \oplus k_{M-1}^s)\},$$

where the symbol $\oplus$ represents a summation modulo two. If preset with the single code pattern, the bit pattern converter 17 supplies the adder 13 with a single encryption keying bit in response to each memory output bit pattern or each index. An original encrypted bit sequence produced by addition of the input data bit sequence and the single keying bit sequence modulo two is identical with the original encrypted bit sequence produced in response to the s keying bit sequences. The s preset unit code patterns $K_1$ through $K_s$ are therefore equivalent to the single code pattern K.

It may, however, be as will shortly be discussed that an encryption bit pattern converter for two or more unit code patterns and another encryption bit pattern converter for the single code pattern defined as above, are different from each other as regards hardware. It has been confirmed by Applicant that implementation of a bit pattern converter becomes more readily feasible depending on choice of the preselected number s.

Reverting to the example where the preselected number s is two, let first and second unit code patterns $K_1$ and $K_2$ be more generally:

$$K_1 = (k_0, k_1, \ldots, k_{M/2-1},$$

$$k_0, k_1, \ldots, k_{M/2-1}) \text{ and}$$

$$K_2 = (0, 0, \ldots, 0, 1, 1, \ldots, 1),$$

respectively. The first code pattern is given by a concatenation of two code patterns, each having a pattern length equal to M/2 or $2^{m-1}$ bits. In the second code pattern, the number of binary zeros and the number of binary ones are equal to each other, namely, to M/2. The single code pattern K becomes:

$$K = \{k_0, k_1, \ldots, k_{M/2-1}, (k_0 \oplus 1),$$

$$(k_1 \oplus 1), \ldots, (k_{M/2-1} \oplus 1)\}.$$

With a bit pattern converter for the two code patterns $K_1$ and $K_2$, a first keying bit produced in response to the first code pattern is dependent only on the first through the (m−1)-th output signals $b_0$ to $b_{m-2}$ simultaneously produced by the shift register 16 and is independent on the m-th output signal $b_{m-1}$. A second keying bit produced in response to the second code pattern is identical with the m-th output signal $b_{m-1}$. It is therefore possible to implement the bit pattern converter by an ROM of a half number of memory bits as compared with another bit pattern converter for the single code pattern K. The former bit pattern converter is more readily implemented than the latter bit pattern converter. This applies to bit pattern converters comprising microprocessors.

Figure 2:
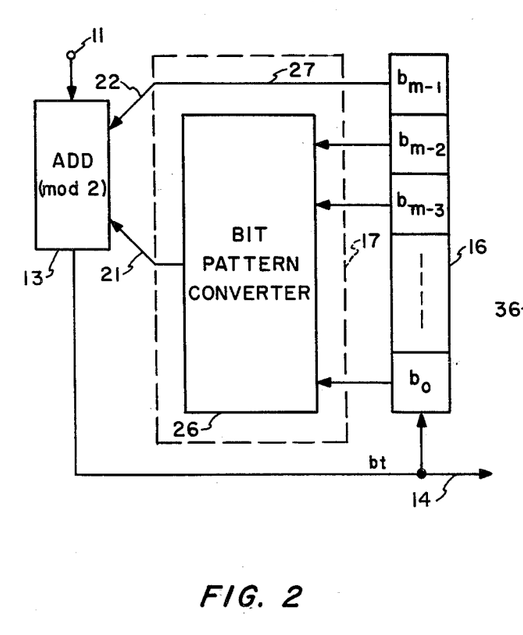
FIG. 2 is a block diagram of an encrypting device according to a second embodiment of this invention.

Turning to FIG. 2 for a short while, an encrypting device according to a second embodiment of this invention is similar to that illustrated with reference to FIG. 1, except that two unit code patterns $K_1$ and $K_2$ are selected as described above. The feedback line 12 described in conjunction with FIG. 1 is depicted as first and second feedback leads 21 and 22. The encryption bit pattern converter 17 comprises a unit encryption bit pattern converter 26 and an encryption conductor 27. The bit pattern converter 26 is preliminarily loaded with the M/2-bit code pattern and is responsive to the first through the (m−1)-th output signals for supplying a first encryption keying bit to the first feedback lead 21. Responsive to the m-th output signal, the conductor 27 supplies a second encryption keying bit to the second feedback lead 22. The first and the second keying bits are equivalent to a single encryption keying bit produced in response to the single M-bit code pattern and a memory output bit pattern composed of the first through the m-th output signals of the shift register 16.

With an encrypting device illustrated with reference to either of FIGS. 1 and 2, each input data bit is encrypted into an original encrypted bit with a delay equal to that of the adder 13. This is astonishingly shorter than the delay that has been necessary with an encrypting device according to the DES algorithm referred to hereinabove.

At the start of a new sequence of input data bits, the shift register 16 might be loaded with the encrypted bits produced during encryption of a next previous sequence of input data bits. This does not adversely affect proper operation for the new sequence. At any rate, all possible memory output bit patterns will appear with a common probability during a sufficiently long interval of time. The bit pattern converter 17 therefore produces the respective bits of each code pattern with an equal frequency. Let it now be assumed that unity is selected as the preselected number s. This does not result in loss of generality in principle as discussed heretobefore. The bit pattern converter 17 produces each bit of the single code pattern with a frequency dependent on the pattern length M. The adder 13 inverts the polarity of the input data bits at a rate equal to a ratio of the number of binary one code pattern bits to the pattern length M expressed in terms of the number of code pattern bits.

To speak of the encrypting device of FIG. 2 in particular, the ratio mentioned above is equal to 0.5. The adder 13 therefore produces the encrypted bits with the polarity of a half of the input data bits inverted in the encrypted bit sequence on the average. This gives an unexpectedly raised degree of secrecy to the encrypted bit sequence.

What corresponds in the encrypting devices illustrated with reference to FIGS. 1 and 2 to the key as called in the art, is the at least one code pattern preset in the bit pattern converter 17. As the case may be, the at least one unit code pattern is preset in the unit bit pattern converter 26. In view of the above-discussed substantial equivalency between a single code pattern and two or more unit code patterns, the greatest possible number of different code patterns is equal to $2^J$, where J represents the greatest possible number of different memory output bit patterns. For the encrypting device of FIG. 1, the latter greatest possible number J is equal to M. For the encrypting device of FIG. 2, the latter greatest possible number J is equal to M/2. In the latter case, the greatest possible number of different code patterns is as great as $2^8$ or 256 even when only four is selected as the predetermined number m. In a conventional encrypting device with a maximal-length sequence generator of four shift register stages, the number of keys is only two. It is therefore possible with the encrypting device according to this invention to quite astonishingly increase the number of keys, from which one or a few are selected for use in the encrypting device.

It is, however, to be noted that the greatest possible number J of different code patterns decreases to a certain extent as will later be discussed when the code patterns are selected so as to have substantially no cross-correlation. It is nevertheless possible with the encrypting device illustrated with reference to FIGS. 1 and 2 to provide an unexpectedly increased number of keys.

Referring back to FIG. 1, a decrypting device is for use as a counterpart of the encrypting device illustrated with reference to that figure. Responsive to a sequence of local clock pulses of a local clock period equal to the predetermined encryption clock period and responsive to the encrypted bit sequence which is either received from the transmission line 15 or reproduced from the recording medium and which will be called a sequence of "receive" encrypted bits, the decrypting device supplies a device output terminal 31 with a sequence of decrypted bits that is a reproduction of the input data bit sequence. The decrypted bit and the receive encrypted bit at each clock period t will be designated again by $a_t$ and $b_t$, respectively. As will presently be described, decryption keying bits $K_t$ of the preselected number s are fed to a feedforward line 32 during each local clock period. A decryption adder 33 is for calculating a sum modulo two of each receive encrypted bit and the decryption keying bit or bits concurrently supplied from the feedforward line 32. The receive encrypted bit sequence is supplied to the adder 33 through a device input line 34. The decrypted bit sequence is given by a sequence of the sums modulo two.

Besides the decryption adder 33, the receive encrypted bit sequence is supplied to an input terminal of a decryption shift register 36 of the structure and operation of the encryption shift register 16 used in the counterpart encrypting device. The decryption memory output bit pattern should be given by that permutation of the decryption output signals of the shift register 36 which is the same as that used on deriving the encryption memory output bit pattern. A decryption bit pattern converter 37 is preliminarily loaded with the code pattern or patterns K, s in number, used in the encryption bit pattern converter 17. A pattern lead 38 may be used on loading the decryption bit pattern converter 37 with the code pattern or patterns.

Reviewing the encrypting device under consideration, it is possible to denote the original encrypted bits retained in the first through the m-th stages of the shift register 16 when an input data bit $a_t$ is supplied to the encryption adder 13, as a current input data bit, by:

$(b_{t-1}, b_{t-2}, \ldots, b_{t-m})$, respectively. The encryption keying bit or bits delivered to the adder 13, are $k_t$. An original encrypted bit $b_t$ produced at this instant is therefore given by:

$$b_t = a_t \oplus k_t.$$

If the original encrypted bit sequence $\{b_t\}$ is supplied to the decryption adder 33 and the decryption shift register 36 for the decryption bit pattern converter 37 with no error, the receive encrypted bits retained in the first through the m-th decryption stages of the shift register 36 are:

$(b_{t-1}, b_{t-2}, \ldots, b_{t-m})$, when a receive encrypted bit $b_t$ reaches the decryption adder 33 and the decryption shift register 36 through the input line 34. It is clear from this that synchronism is automatically established between the encrypting and the decrypting devices without resorting to a superfluous synchronizing bit. The decryption keying bit or bits produced by the decryption bit pattern converter 37 are identical with the encryption keying bit or bits $k_t$ used in the counterpart encrypting device on deriving the original encrypted bit $b_t$. The decryption adder 33 therefore produces a decrypted bit, denoted by $a_t$, as:

$$a_t = b_t \oplus k_t,$$

producing a correct reproduction of the input data bit sequence.

When an error appears in the receive encrypted bit sequence at a particular receive encrypted bit $b_t'$, errors will occur in the decrypted bits for a duration of $(m+1)$ clock periods, during which the particular receive encrypted bit is present in the decryption shift register 36. The decrypting device returns to normal in the $(m+1)$ clock periods with the synchronism automatically restored and with the receive encrypted bit sequence correctly decrypted.

Figure 3:
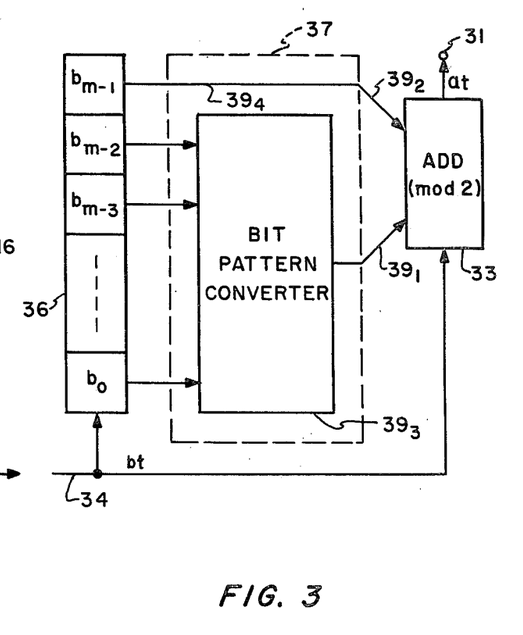
FIG. 3 is a block diagram of a decrypting device for use in decrypting an encrypted bit sequence produced by the encrypting device depicted in FIG. 2.

Turning to FIG. 3, a decrypting device for use in combination with the encrypting device illustrated with reference to FIG. 2 comprises similar parts designated by like reference numerals. The feedforward line 32 illustrated in FIG. 1 is depicted as first and second feedforward leads $39_1$ and $39_2$. The decryption bit pattern converter 37 comprises a unit decryption bit pattern converter $39_3$ and a decryption conductor $39_4$ corresponding to the unit encryption bit pattern converter 26 and the encryption conductor 27.

In order to insure the secrecy of information with the decryption devices illustrated with reference to FIGS. 1 and 3, it is desirable that nearly a half of the decrypted bits should have a polarity opposite to the other decrypted bits if the decryption bit pattern converter 37 or $39_3$ were loaded with an erroneous code pattern which is different from a correct code pattern preset in the counterpart encryption bit pattern converter 17 or 26. The erroneous code pattern or a single erroneous code pattern equivalent to an erroneous code pattern and other code pattern or patterns, will be denoted by K'. Considering the encrypting and the decrypting devices of FIG. 1, it will be assumed that the erroneous code pattern K' consists of first through M-th code pattern bits:

$(k_0', k_1', \ldots, k_{M-1}')$.

The encryption keying bit produced by the encryption bit pattern converter 17 according to the illustrated example during a clock period t in response to an encryption memory output bit pattern of the binary number 1, is the $(i+1)$-th correct code pattern bit $k_i$, which will be designated by $k_t(i)$. The original encrypted bit produced by the encryption adder 13 for an input data bit $a_t$ is given by:

$$b_t = a_t \oplus k_t(i).$$

The decryption memory output bit pattern produced by the decryption shift register 36 when a receive encrypted bit $b_t$ arrives at the input line 34, are identical with the encryption memory output bit pattern used on producing the original encrypted bit under consideration. The decryption keying bit produced by the decryption bit pattern converter 37 is therefore the $(i+1)$-th erroneous code pattern bit $k_i'$, which may or may not be identical with the correct code pattern bit $k_t(i)$ and will be denoted by $k_t(i)'$. The decrypted bit, now designated by $a_t'$, is therefore given by:

$$a_t' = b_t \oplus k_t(i)'$$
$$= a_t \oplus (k_t(i) \oplus k_t(i)').$$

As described before, use of any one of the code pattern bits is equally probable both for the correct and the erroneous code patterns K and K'. Considering a combined code pattern $(K \oplus K')$, the ratio of the number of decrypted bits of a certain polarity to the number of other decrypted bits is decided by the number of binary ones included in the code pattern bits of the combined code pattern. The combined code pattern represents what is referred to in the art as a signal or intercode distance between the two code patterns K and K'.

It is now understood that the code patterns to be preset in the encryption bit pattern converter 17 and consequently in the decryption bit pattern converter 37 should be selected from a set of code patterns or keys in which the intercode distance between any two element code patterns is neither equal to zero nor to the greatest possible number of memory output bit pattern J, such as M, but is equal to or near to a half of that greatest possible number J/2. Various methods of obtaining such a code pattern set are already known as problems in the code theory. Some are described by W. W. Peterson and E. J. Weldon, Jr., in a book entitled "Error Correcting Code," Second Edition, 1972, published by "The MIT Press," pages 206–211.

One of such code pattern sets will be given in Table, which follows, for a pattern length J of sixteen bits, namely, for four-bit encryption or decryption memory output bit patterns. Six bits of each code pattern are for use as information bits and ten remaining bits, as redundant bits. Inasmuch as the information bits are six in number, the code pattern set consists of sixty-four element code patterns $K_1$ through $K_{64}$. Each code pattern may be represented in general by $(k_0, k_1, \ldots, k_{15})$. The code patterns have a feature such that the bits arranged in a certain permutation, such as $(k_3, k_9, k_5, k_{13}, k_3, k_6, k_{10}, k_2, k_4, k_{11}, k_0, k_7, k_8, k_{12}, k_{15}, k_{14})$, is an element code pattern of a minimum intercode distance (a minimum weight) of six and a maximum intercode distance (a maximum weight) of ten. The first six bits $(k_3, k_9, k_5, k_{13}, k_1, k_6)$ are used as the information bits and the remaining bits, as the redundant bits. It is possible to predetermine the permutation in an optional manner. The element code patterns are the BCH cyclic codes as called in the art.

degree of encryption is remarkably excellent. When the receive encrypted bit sequence is decrypted by the use of at least one erroneous code pattern, the decrypted bit sequence includes polarity inverted bits at the above-

TABLE

|  | $k_0$ | $k_1$ | $k_2$ | $k_3$ | $k_4$ | $k_5$ | $k_6$ | $k_7$ | $k_8$ | $k_9$ | $k_{10}$ | $k_{11}$ | $k_{12}$ | $k_{13}$ | $k_{14}$ | $k_{15}$ |
|---|---|---|---|---|---|---|---|---|---|---|---|---|---|---|---|---|
| $K_1$ | 1 | 0 | 0 | 0 | 1 | 0 | 1 | 0 | 0 | 0 | 0 | 1 | 1 | 0 | 0 | 1 |
| $K_2$ | 0 | 1 | 1 | 0 | 1 | 0 | 0 | 0 | 1 | 0 | 0 | 1 | 1 | 0 | 0 | 0 |
| $K_3$ | 0 | 1 | 0 | 1 | 1 | 0 | 1 | 0 | 0 | 0 | 0 | 1 | 0 | 1 | 0 | 0 |
| $K_4$ | 1 | 0 | 1 | 1 | 1 | 0 | 0 | 0 | 1 | 0 | 0 | 1 | 1 | 1 | 0 | 0 |
| $K_5$ | 1 | 1 | 1 | 0 | 0 | 0 | 1 | 0 | 1 | 0 | 0 | 0 | 0 | 0 | 0 | 1 |
| $K_6$ | 0 | 0 | 1 | 1 | 0 | 0 | 1 | 0 | 1 | 0 | 0 | 0 | 0 | 1 | 0 | 1 |
| $K_7$ | 1 | 1 | 0 | 1 | 0 | 0 | 0 | 0 | 0 | 0 | 0 | 1 | 1 | 0 | 0 | 1 |
| $K_8$ | 1 | 1 | 0 | 0 | 0 | 0 | 1 | 0 | 0 | 1 | 1 | 1 | 0 | 0 | 0 | 0 |
| $K_9$ | 1 | 0 | 0 | 1 | 1 | 0 | 0 | 0 | 0 | 1 | 1 | 0 | 0 | 1 | 0 | 0 |
| $K_{10}$ | 1 | 0 | 1 | 0 | 1 | 0 | 1 | 0 | 1 | 1 | 1 | 0 | 1 | 0 | 0 | 0 |
| $K_{11}$ | 0 | 1 | 0 | 0 | 1 | 0 | 0 | 0 | 0 | 1 | 1 | 0 | 1 | 0 | 0 | 1 |
| $K_{12}$ | 0 | 0 | 0 | 1 | 0 | 0 | 1 | 0 | 0 | 1 | 1 | 1 | 1 | 1 | 0 | 1 |
| $K_{13}$ | 1 | 1 | 1 | 1 | 0 | 0 | 0 | 0 | 1 | 1 | 1 | 1 | 0 | 1 | 0 | 1 |
| $K_{14}$ | 0 | 0 | 1 | 0 | 0 | 0 | 0 | 0 | 1 | 1 | 1 | 1 | 0 | 0 | 0 | 1 |
| $K_{15}$ | 0 | 1 | 1 | 1 | 1 | 0 | 1 | 0 | 1 | 1 | 1 | 0 | 1 | 1 | 0 | 0 |
| $K_{16}$ | 1 | 0 | 1 | 0 | 0 | 1 | 1 | 1 | 0 | 0 | 1 | 0 | 0 | 0 | 0 | 0 |
| . |
| $K_{64}$ | 1 | 1 | 0 | 1 | 1 | 1 | 0 | 1 | 1 | 1 | 0 | 0 | 1 | 1 | 0 | 0 |

The element code patterns in the Table are determined as follows.

At first, the information bits ($k_3$, $k_9$, $k_5$, $k_{13}$, $k_1$, $k_6$) are given binary zero or zeros and one or ones in different manners for the respective code patterns. For example, the information bits of the element code patterns $K_1$ and $K_2$ are given (000001) and (000010). Next, a polynomial of x is defined for each code pattern by:

$$k_3 x^{14} + k_9 x^{13} + k_5 x^{12} + k_{13} x^{11} + k_1 x^{10} + k_6 x^9.$$

The polynomial is divided by:

$$(x^4 + x + 1)(x^4 + x^3 + x^2 + x + 1)(x + 1).$$

The remainder is written as a polynomial:

$$r_1 x^8 + r_2 x^7 + r_3 x^6 + r_4 x^5 + r_5 x^4 + r_6 x^3 + r_7 x^2 + r_8 x + r_9.$$

Nine of the ten redundant bits are determined by:

| $k_{10} = r_1$ | $k_2 = r_2$ | $k_4 = r_3$ |
|---|---|---|
| $k_{11} = r_4$ | $k_0 = r_5$ | $k_7 = r_6$ |
| $k_8 = r_7$ | $k_{12} = r_8$ | $k_{15} = r_9$. |

The last redundant bit $k_{14}$ in each code pattern is the even parity bit as named in the art. That is, the last bit is decided so that each code pattern may consist of an even number of binary ones.

In each element code pattern, the redundant bits are uniquely decided by the information bits as described above. It is therefore possible to make the encryption or decryption bit pattern converter produce only the information bits of a preset one of the code patterns in response to the memory output bit pattern and immediately thereafter the redundant bits. The redundant bits may be produced by another ROM section accessed by the information bits. Alternatively, the microprocessor may calculate the redundant bits in response to the information bits.

The element code patterns include binary ones, from six to ten in number. The original encrypted bit sequence therefore includes polarity inverted bits at a ratio between 6/16 or 0.375 and 10/16 or 0.625. The mentioned ratio. The "decrypted" information can hardly be understood by the recipient of the original encrypted bit sequence.

With an encrypting and decrypting system described above with reference to the drawing figures, an unauthorized recipient must find out the code patterns on deciphering an encrypted bit sequence. It is, however, very difficult for him to know all bits of a code pattern from a portion thereof. This is because he has no information as regards those bits of a code pattern from which other bits are decided as described in conjunction with the BCH cyclic code. Furthermore, all bits may be selected independently of one another. He must analyse a considerable number of the encrypted bits, such as $2^m$ bits. The number $2^m$ is usually greater than the number 2m described hereinabove in connection with an encrypting and decrypting system of the type described in the Savage article.

Figure 4:
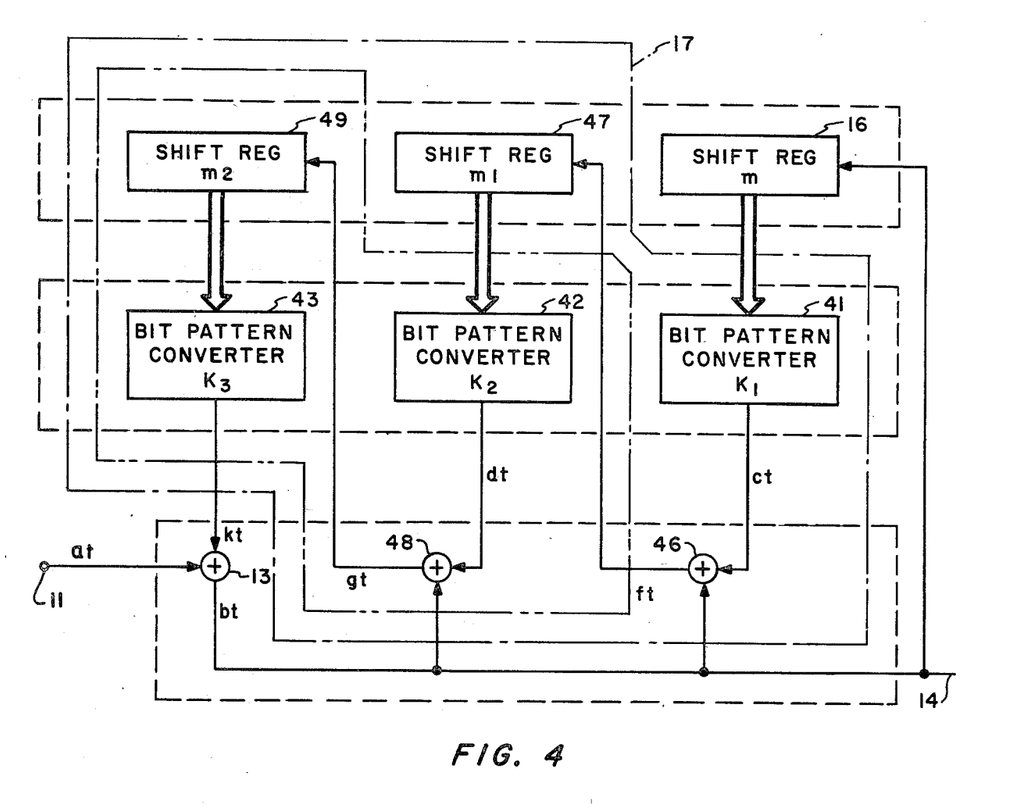
FIG. 4 is a block diagram of an encrypting device according to a third embodiment of this invention.

Referring now to FIG. 4, an encrypting device according to a third embodiment of this invention comprises similar parts designated by like reference numerals. The encryption bit pattern converter 17 comprises first through third encryption converters 41, 42, and 43 loaded with first through third code patterns $K_1$, $K_2$, and $K_3$, each of which may be the single code pattern described before. Responsive to each encryption memory output bit pattern produced by the encryption shift register 16 and the code patterns $K_1$ through $K_3$, the converters 41 to 43 produce first and second converted encryption bits $c_t$ and $d_t$ and the at least one encryption keying bit $k_t$, respectively, as follows.

A first additional encryption adder 46 is for calculating a first encryption sum modulo two of the original encrypted bit $b_t$ and the first converted bit $c_t$. The sum gives a first encryption sum bit $f_t$. The first sum bits $f_t$'s successively produced by the adder 46 are stored and shifted in a first additional encryption shift register 47, which produces a first additional encryption memory output bit pattern. Responsive to the first additional memory output bit pattern and the second code pattern, the second converter 42 produces the second converted bit. A second additional encryption adder 48 is for calculating a second encryption sum modulo two of the encrypted bit $b_t$ and the second converted bit $d_t$. The second sum gives a second encryption sum bit $g_t$. The second sum bits $g_t$'s are treated by a second additional encryption shift register 49 into a second additional encryption memory output bit pattern, supplied with which the third converter 43 produces the at least one encryption keying bit according to the third code pattern $K_3$.

With an encrypting device illustrated above with reference to FIG. 1 or 2, the encrypted bits are shifted into a single shift register 16 as they are. In contrast, the encrypted bits are not shifted in the additional shift registers 47 and 49. This makes it more difficult for an unauthorized recipient to decipher the encrypted bit sequence.

Reviewing FIG. 4, the bit pattern converter 17 comprises a unit encryption bit pattern converter 41 preliminarily loaded with a unit code pattern $K_1$ and responsive to an encryption memory output bit pattern produced by the encryption shift register 16 for producing a converted encryption bit $c_t$. An encryption adder 46 calculates the first sum modulo two to produce an encryption sum bit $f_t$ given by the sum. Using the encryption clock pulses as shift pulses, an additional encryption shift register 47 retains a prescribed number $m_1$ of such sum bits $f_t$'s during each encryption clock period and produces an encryption shift register bit pattern represented by the $m_1$ sum bits retained therein. An additional encryption bit pattern converter 42 preliminarily loaded with an additional code pattern $K_2$, may directly supply the adder 13 with the encryption keying bit or bits $k_t$. Alternatively, an additional encryption bit pattern converting section may comprise the bit pattern converters 42 and 43, the other adder 48, and the other shift register 49. The shift registers 17, 47, and 49 have a predetermined number m of stages, a first prescribed number $m_1$ of stages, and a second prescribed number $m_2$ of stages, respectively. The predetermined and the first and the second prescribed numbers may or may not be equal to one another.

When viewed from a different angle, the encrypting device comprises a modulo-two encryption adding section comprising the adders 46 and 13 for calculating a first encryption sum modulo two of each original encrypted bit $b_t$ and an encryption adding section input bit $c_t$ and a second encryption sum modulo two of each input data bit $a_t$ and at least one encryption keying bit $k_t$ to produce an encryption sum bit $f_t$ given by the first sum and the sequence of original encrypted bits with each original encrypted bit given by the second sum. An encryption shift register section comprising the shift registers 16 and 47 are supplied with the encryption clock pulses as shift pulses and retains, during each encryption clock period, a predetermined number m of the original encrypted bits and a prescribed number $m'$ of the encryption sum bits successively produced by the adding section to produce a unit and an additional encryption shift register bit pattern represented by the m encrypted bits retained therein and the $m'$ successive sum bits retained therein, respectively.

An encryption bit pattern converting section comprises the first converter 41 responsive to the unit code pattern $K_1$ for converting the unit shift register bit pattern to a unit converted encryption bit $c_t$, which is supplied to the adding section as the adding section input bit $c_t$. The bit pattern converting section further comprises the second converter 42, the second adder 48, the second additional shift register 49, and the third converter 43 and are loaded with two code patterns $K_2$ and $K_3$ as at least one code pattern for converting the additional shift register bit pattern to at least one additional converted encryption bit, which is supplied to the adding section as the above-mentioned at least one keying bit.

As described above, the encryption bit pattern converting section may comprise a unit encryption bit pattern converter 41 preliminarily loaded with the unit code pattern $K_1$ and responsive to the unit encryption shift register bit pattern for producing the unit converted encryption bit $c_t$. A first additional encryption bit pattern converter 42 is preliminarily loaded with a first additional code pattern $K_2$ and responsive to the additional encryption shift register bit pattern for producing an intermediate converted encryption bit $d_t$. The converting section further comprises a modulo-two encryption adder 48 for calculating a sum modulo two of the intermediate converted encryption bit $d_t$ and the original encrypted bit $b_t$ produced by the adding section during the above-mentioned each encryption clock period to produce an intermediate encryption bit $g_t$ given by the sum calculated thereby, and an encryption shift register 49 responsive to the encryption clock pulses supplied thereto as shift pulses for retaining, during each encryption clock period, a preselected number $m''$ of the intermediate encryption bits successively produced by the adder 48 to produce an auxiliary encryption shift register bit pattern represented by the intermediate encryption bits retained thereby. A second additional encryption bit pattern converter 43 is preliminarily loaded with a second additional code pattern $K_3$ and responsive to the auxiliary shift register bit pattern for producing the at least one additional converted bit.

Figure 5:
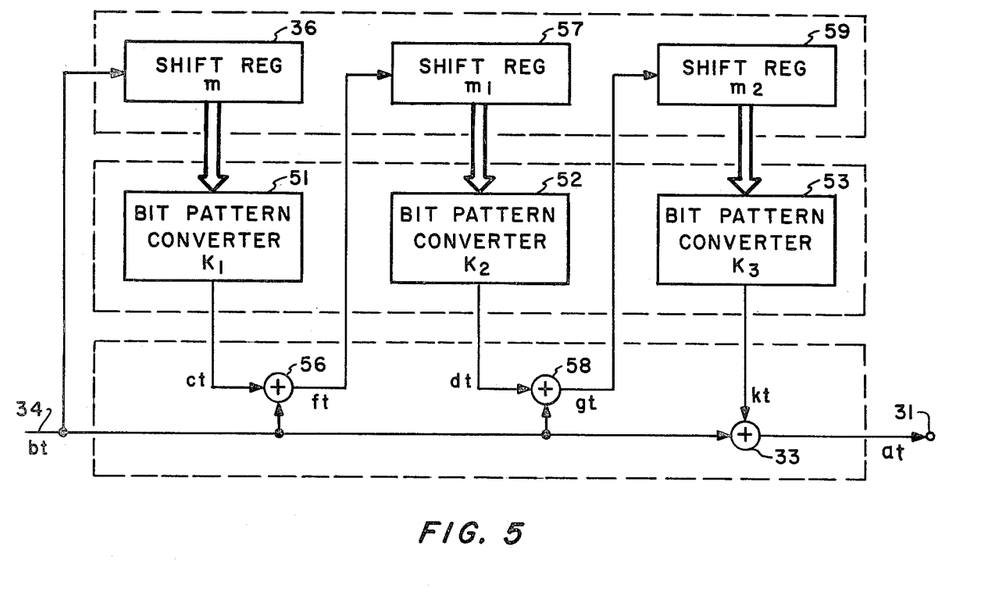
FIG. 5 is a block diagram of a decrypting device for use as a counterpart of the encrypting device illustrated in FIG. 4.

A decrypting device depicted in FIG. 5 is for use as a counterpart of the encrypting device of FIG. 4 and comprises similar parts designated by the reference numerals 31, 32, 33, 34, and 36. First through third decryption bit pattern converters 51, 52, and 53, a first additional decryption adder 56, a first additional decryption shift register 57, a second additional decryption adder 58, and a second additional decryption shift register 59 are counterparts of the elements 41 through 43 and 46 through 49. The unit and the additional code patterns $K_1$ through $K_3$ are used to produce first and second converted decryption bits $c_t$ and $d_t$ and at least one decryption keying bit $k_t$ in response to the receive encrypted bit $b_t$ and first and second modulo-two decryption sums $f_t$ and $g_t$. Inasmuch as in FIG. 4:

$$a_t \oplus k_t = b_t,$$

it is obvious that:

$$b_t \oplus k_t = a_t,$$

that is, the decrypted bits $a_t$'s are correct reproductions of the respective input data bits.

Figure 6:
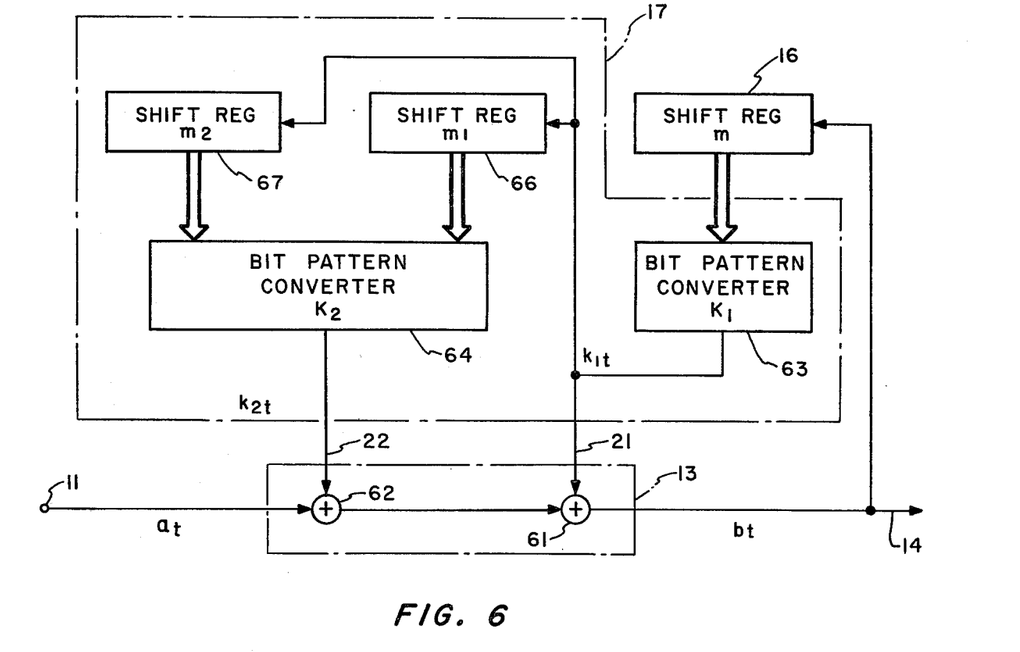
FIG. 6 is a block diagram of an encrypting device according to a fourth embodiment of this invention.

Referring to FIG. 6, an encrypting device according to a fourth embodiment of this invention comprises similar parts designated by like reference numerals. Two feedback lines 21 and 22 are supplied with a unit encryption keying bit $k_{1t}$ and at least one additional encryption keying bit $k_{2t}$. The encryption adder modulo two 13 is shown separately as unit and additional encryption adders modulo two 61 and 62. The encrypting device being illustrated is different from that illustrated with reference to FIG. 2 in that the encryption bit pattern converter 17 comprises unit and additional encryption bit pattern converters 63 and 64 preliminarily loaded with unit and at least one additional code patterns $K_1$ and $K_2$, respectively. The unit code pattern converter 63 is for producing the unit keying bit $k_{1t}$ in response to the encryption memory output bit pattern produced by the encryption shift register 16. The additional bit pattern converter 64 is accompanied by first and second additional encryption shift registers 66 and 67 for retaining, during each encryption clock period, first and second prescribed numbers $m_1$ and $m_2$ of the unit keying bits successively produced by the unit encryption bit pattern converter 63, respectively. The first and the second additional shift registers 66 and 67 are for producing, in cooperation with each other, an encryption shift register bit pattern represented by a predetermined permutation of the $m_1$ and the $m_2$ unit keying bits retained therein, respectively. Responsive to the shift register bit pattern, the additional bit pattern converter 64 produces the at least one additional encryption keying bit $k_{2t}$.

It is possible to optionally select the predetermined and the first and the second prescribed numbers. The pattern length of the additional code pattern is decided according to the greatest possible number of different shift register bit patterns produced by the cooperation of the shift registers 66 and 67. The original encrypted bit $b_t$ is given by:

$$b_t = a_t \oplus k_{1t} \oplus k_{2t}.$$

Figure 7:
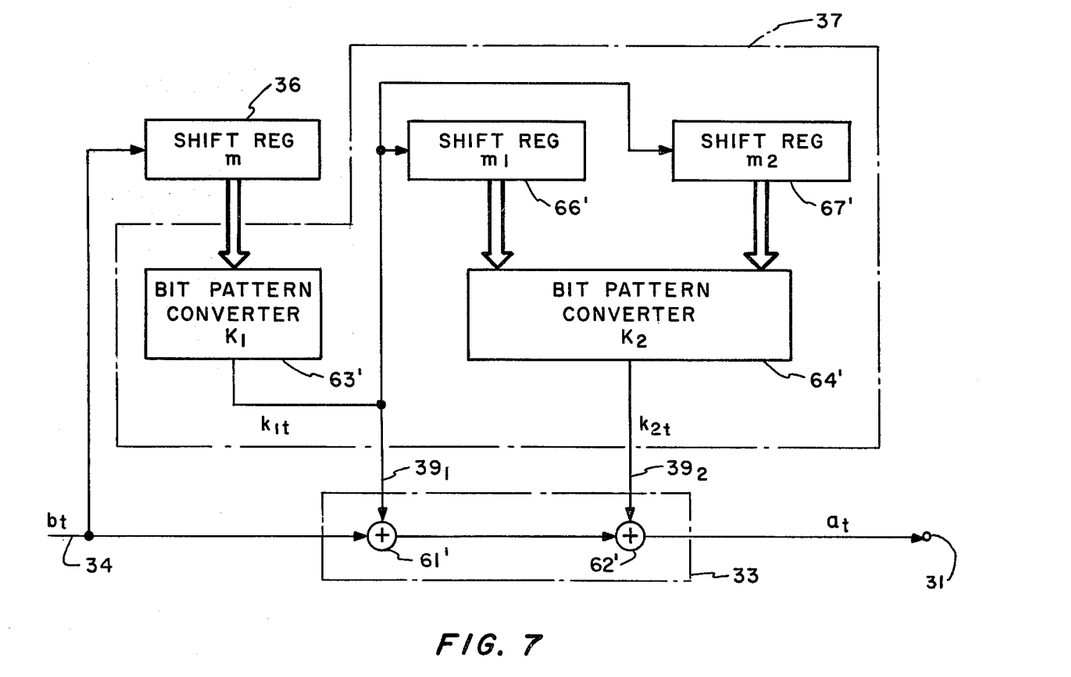
FIG. 7 is a block diagram of a decrypting device for use in combination with the encrypting device shown in FIG. 6.

A decrypting device shown in FIG. 7 is for use in combination with the encrypting device illustrated with reference to FIG. 6. Elements 61', 62', 63', 64', 66', and 67' are equivalents of the elements 61 through 64 and 66 and 67. It is obvious that each decrypted bit given by a sum modulo two ($b_t \oplus k_{1t} \oplus k_{2t}$) is a faithful reproduction of the input data bit. It is very difficult for an unauthorized recipient to decipher the encrypted bit sequence because the original encrypted bits are not shifted in the additional shift registers 66 and 67 in the encrypting device.

With the encrypting and decrypting system so far described with reference to FIGS. 1 through 7, it is possible to encrypt a sequence of input data digits, each comprising a plurality of parallel and/or series bits, into a sequence of original encrypted digits and to carry out the decryption. For example, only one of the parallel and/or series bit sequences may be encrypted into a sequence of original encrypted bits by one of the encrypting devices. Alternatively, all parallel and/or series bit sequences may be encrypted by the same or different encrypting devices.

Figure 8:
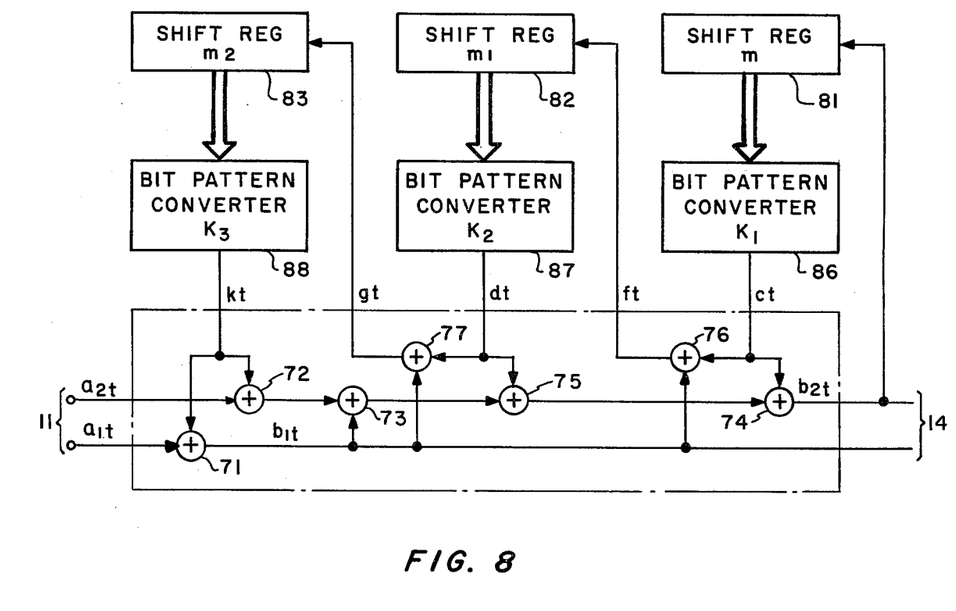
FIG. 8 is a block diagram of an encrypting device according to a fifth embodiment of this invention.

Turning now to FIG. 8, an encrypting device according to a fifth embodiment of this invention is for encrypting a sequence of input data digits, each comprising first and second parallel input data bits $a_{1t}$ and $a_{2t}$, into a sequence of original encrypted digits, each comprising first and second original encrypted bits $b_{1t}$ and $b_{2t}$. The first and the second input data bits may be any two of a plurality of parallel input data bits for each input data digit.

In an encryption modulo-two adding section, a first encryption adder 71 is for calculating a first encryption sum modulo two of each first input data bit and at least one encryption keying bit $k_t$ to produce a sequence of the first original encrypted bits with each first original encrypted bit given by the first sum. A combination of second through fifth encryption adders 72, 73, 74, and 75 is for calculating a second encryption sum modulo two of each second input data bit, the at least one keying bit, each first original encrypted bit, and first and second encryption adding section input bits $c_t$ and $d_t$ to produce a sequence of the second original encrypted bits with each second original encrypted bit given by the second sum. Sixth and seventh encryption adders 76 and 77 are for calculating a third and a fourth encpytion sum modulo two of each first original encrypted bit and the first and the second adding section input bits to produce first and second encryption adding section output bits $f_t$ and $g_t$ given by the third and the fourth sums, respectively.

An encryption shift register section is responsive to the encryption clock pulses supplied thereto as shift pulses. A unit encryption shift register 81 is for retaining a predetermined number m of the second original encrypted bits during each encryption clock period. A first additional encryption shift register 82 is for retaining a first prescribed number $m_1$ of the first adding section output bits successively produced by the sixth adder 76. A second additional encryption shift register 83 is for retaining a second prescribed number $m_2$ of the second adding section output bits successively produced by the combination of adders 72 through 76. The unit and the first and the second additional shift registers 81 through 83 concurrently produce a unit and a first and a second additional shift register bit pattern represented by the m second original encrypted bits and the $m_1$ first and the $m_2$ second adding section output bits retained therein, respectively.

In an encryption bit pattern converting section, a unit bit pattern converter 86 is for keeping a unit code pattern $K_1$ and for converting the unit shift register bit pattern to a unit converted encryption bit. A first additional encryption bit pattern converter 87 is for keeping a first additional code pattern $K_2$ and the converting the first additional shift register bit pattern to a first additional converted encryption bit. A second additional encryption bit pattern converter 88 is for keeping at least one second additional code pattern $K_3$ and for converting the second additional shift register bit pattern to at least one second additional converted encryption bit. The unit converted bit and the first and the at least one second additional converted bits are supplied to the adding section as the first and the second adding section input bits $c_t$ and $d_t$ and the at least one keying bit $k_t$, respectively.

Figure 9:
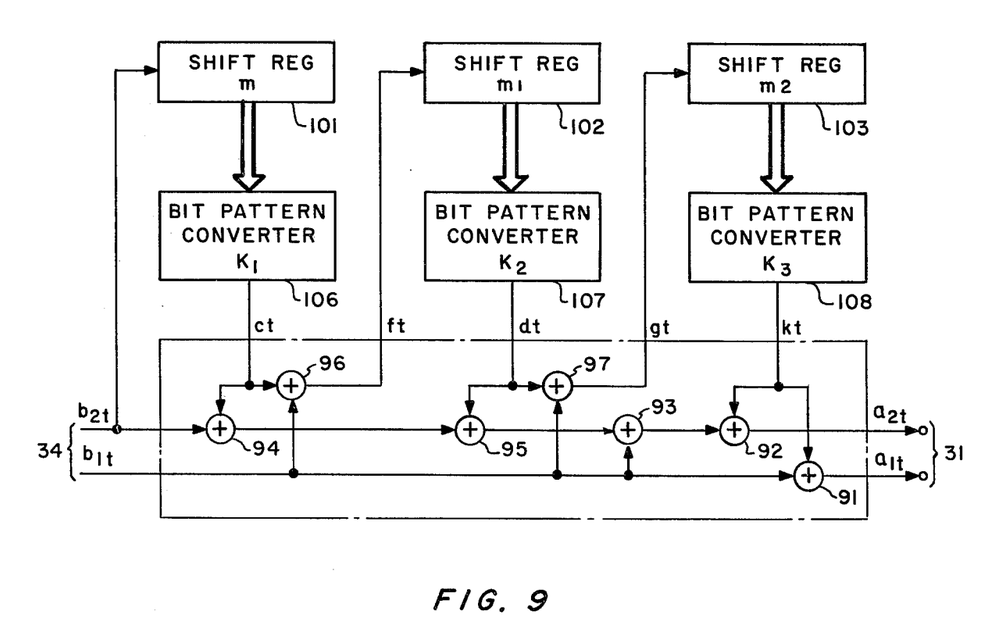
FIG. 9 is a block diagram of a decrypting device for use in decrypting an encrypted digit sequence produced by the encrypting device illustrated in FIG. 8.

Finally referring to FIG. 9, a decrypting device is for producing a sequence of decrypted digits from a sequence of receive encrypted digits substantially identical with the original encrypted digit sequence produced by the encrypting device illustrated with reference to FIG. 8. A sequence of local clock pulses is for timing the receive encrypted and the decrypted digits with a local clock period equal to the encryption clock period. Each decrypted digit comprises first and second decrypted bits, which will again be designated by $a_{1t}$ and $a_{2t}$. Each receive encrypted digit comprises first and second receive encrypted bits, denoted by $b_{1t}$ and $b_{2t}$.

In a modulo-two decryption adding section, a first decryption adder 91 is for calculating a first decryption sum modulo two of each first receive encrypted bit and at least one decryption keying bit produced as will presently be described. The first decryption sums successively calculated for the respective first receive encrypted bits, give a sequence of the first decrypted bits.

A combination of second through fifth decryption adders 92, 93, 94, and 95 is for calculating a second decryption sum modulo two of each second receive encrypted bit, the at least one decryption keying bit, each first receive encrypted bit, and first and second decryption adding section input bits, denoted by $c_t$ and $d_t$, respectively. In cooperation, the adders 92 through 95 produce a sequence of the second decrypted bits with each second decrypted bit given by the second decryption sum. Sixth and seventh decryption adders 96 and 97 are for calculating a third and a fourth decryption sum modulo two of each first receive encrypted bit and the first and the second decryption adding section input bits, respectively. The sixth and the seventh adders 96 and 97 produce first and second decryption adding section output bits $f_t$ and $g_t$ given by the third and the fourth decryption sums, respectively.

A decryption shift register section is responsive to the local clock pulses supplied thereto as shift pulses. A unit decryption shift register 101 retains m second decrypted bits during each local clock period and produces a unit decryption bit pattern represented by the bits retained therein. A first additional decryption shift register 102 is for retaining $m_1$ first decryption adding section output bits to produce a first additional decryption shift register bit pattern represented by the retained bits. A second additional decryption shift register 103 is for retaining $m_2$ second decryption adding section output bits to produce a second additional shift register bit pattern represented by the retained bits.

In a decryption bit pattern converting section, a unit decryption bit pattern converter 106 is preset with the unit code pattern $K_1$ and is responsive to the unit decryption shift register bit pattern for producing a unit converted decryption bit, which is used as the first decryption adding section input bit $c_t$. A first additional decryption bit pattern converter 107 is for keeping the first additional bit pattern $K_2$ and is responsive to the first additional decryption shift register bit pattern for producing a first additional converted decryption bit, which is supplied to the decryption adding section as the second decryption adding section input bit $d_t$. A second additional decryption bit pattern converter 108 is for keeping the at least one additional code pattern $K_3$ and responsive to the second additional decryption shift register bit pattern for producing at least one additional converted decryption bit as the at least one decryption keying bit $k_t$.

It is possible to use the encryption device illustrated with reference to FIG. 8 in combination with any at least one of the encryption devices illustrated with reference to FIGS. 1, 2, 4, and 6 in encrypting a sequence of input data digits. Each input data digit may comprise one or more dummy input data bits so as to represent three or a similar number of levels.

Any one of the encryption bit pattern converters 41 through 43, 66, 67, and 86 through 88 may be modified according to the teaching described in connection with FIG. 2. Any one of the bit pattern converters 41 through 43 and 86 through 88 may be modified into the encryption bit pattern converter section 17 described in conjunction with FIG. 4. Each of the bit pattern converters 41, 42, and 66 may be preset with a plurality of code patterns, which are equivalent to a single unit or additional code pattern as regards software as described heretobefore. Each code pattern may have a pattern length either longer or shorter than the greatest possible number J of different memory output or shift register bit patterns. As has been pointed out in connection with the encrypting device with reference to FIG. 1, a shift register used in any encrypting device according to this invention is equivalent to a signal distributor.

While this invention has thus far been described in specific conjunction with several embodiments thereof and a number of modifications, it will now be readily feasible for one skilled in the art to carry this invention into effect in various other manners. For example, an input data bit or digit sequence may preliminarily be scrambled, before application to an encrypting device according to this invention, by a conventional scrambler comprising a maximal-length sequence generator. The number of the shift register or registers used in the encrypting device illustrated with reference to any one of FIGS. 1, 2, 4, 6, and 8 is optional provided that the same permutation is used to provide the memory output or shift register bit pattern in the counterpart decrypting device as regards the parallel bit sequences into which the receive encrypted bit or digit sequence is distributed. The adding section described in connection with FIGS. 4, 6, and 8 may be modified in various ways, with the adding section correspondingly modified in the cooperating decrypting device.

What is claimed is:

1. An encrypting device for encrypting a sequence of input data bits into a sequence of encrypted bits in response to a sequence of clock pulses timing said input data bits and said encrypted bits with a predetermined clock period, comprising:
    memory means responsive to the clock pulses for memorizing a predetermined number m of the encrypted bits during each clock period to produce a memory output bit pattern represented by the m encrypted bits memorized therein;
    bit pattern converting means responsive to at least one code pattern for converting said memory output bit pattern to at least one keying bit, said bit pattern converting means storing a code pattern including information bits at predetermined bit positions in said code pattern, other and remaining bits in said code pattern being determined by said stored information bits; and
    modulo-two adding means for calculating a sum modulo two of each input data bit and said at least one keying bit to produce said sequence of encrypted bits with each encrypted bit given by said sum.

2. An encrypting device as claimed in claim 1, wherein said bit pattern converting means comprises means for keeping a unit code pattern as said at least one code pattern and responsive to said memory output bit pattern for producing a unit keying bit as said at least one keying bit.

3. An encrypting device as claimed in claim 1, wherein said bit pattern converting means comprises means for keeping a preselected number s of unit code patterns as said at least one code pattern and responsive to said memory output bit pattern for substantially simultaneously producing s keying bits as said at least one keying bit.

4. An encrypting device as claimed in claims 1, 2, or 3, wherein said at least one code pattern consists of binary bits, equal in number to $2^m$.

5. An encrypting device as claimed in claim 1, said memory means comprising a shift register which has first through $(m-1)$-th and m-th stages as counted from the stage supplied with each encrypted bit from said adding means and by which said clock pulses are used as shift pulses, said first through said (m−1)-th and said m-th stages simultaneously producing first through (m−1)-th and m-th output signals collectively as said memory output bit pattern, respectively, wherein said bit pattern converting means comprises:

a bit pattern converter for keeping a $2^{m-1}$-bit code pattern and responsive to said first through said (m−1)-th output signals for producing a first keying bit as one of said at least one keying bit; and a conductor responsive to said m-th output signal for producing a second keying bit as another of said at least one keying bit;

said at least one code pattern being equivalent to two $2^{m-1}$-bit code patterns, one being given by a concatenation of two code patterns, each being identical with said $2^{m-1}$-bit code pattern, the other being given by a succession of binary zeros, $2^{m-1}$ in number, followed by binary ones, $2^{m-1}$ in number.

6. An encrypting device as claimed in claim 1, said at least one code pattern is at least two in number and given by a unit code pattern and at least one additional code pattern, wherein said bit pattern converting means comprises:

a unit bit pattern converter for keeping said unit code pattern and responsive to said memory output bit pattern for producing a converted bit;

a modulo-two adder for calculating a sum modulo two of said converted bit and the encrypted bit produced by said adding means during said each clock period to produce a sum bit given by the sum calculated thereby;

shift register means responsive to the clock pulses supplied thereto as shift pulses for retaining, during each clock period, a prescribed number of the sum bits successively produced by said adder to produce a shift register bit pattern represented by the sum bits retained therein; and additional bit pattern converting means responsive to said at least one additional code pattern for converting said shift register bit pattern to said at least one keying bit.

7. An encrypting device as claimed in claim 1, said at least one code pattern is at least two in number and given by a unit code pattern and at least one additional code pattern, said at least one keying bit consisting of a unit keying bit and at least one additional keying bit, wherein said bit pattern converting means comprises:

a unit bit pattern converter for keeping said unit code pattern and responsive to said memory output bit pattern for producing said unit keying bit;

at least a first and a second shift register responsive to the clock pulses supplied thereto as shift pulses for retaining, during each clock period, a first and a second prescribed number of the unit keying bits successively produced by said unit bit pattern converter, respectively, to produce in cooperation with each other a shift register bit pattern represented by the unit keying bits retained therein, respectively; and additional bit pattern converting means responsive to said at least one additional code pattern for converting said shift register bit pattern to said at least one additional keying bit.

8. An encryption device for encrypting a sequence of input data bits into a sequence of encrypted bits in response to a sequence of clock pulses timing said input data bits and said encrypted bits with a predetermined clock period, comprising:

modulo-two adding means for calculating a first sum modulo two of each encrypted bit and an adding means input bit and a second sum modulo two of each input data bit and at least one keying bit to produce a sum bit given by said first sum and said sequence of encrypted bits with each encrypted bit given by said second sum;

shift register means responsive to the clock pulses supplied thereto as shift pulses for retaining, during each clock period, a predetermined number m of the encrypted bits and a prescribed number of the sum bits successively produced by said adding means to produce a unit and an additional shift register bit pattern represented by the m encrypted bits retained therein and the sum bits retained therein, respectively;

bit pattern converting means responsive to a unit code pattern for converting said unit shift register bit pattern to a unit converted bit and responsive to at least one additional code pattern for converting said additional shift register bit pattern to at least one additional keying bit; and means for supplying said unit and said at least one additional converted bits to said adding means as said adding means input bit and said at least one keying bit, respectively.

9. An encrypting device as claimed in claim 8, said at least one additional code pattern being two in number and given by a first and a second additional code pattern, wherein said bit pattern converting means comprises:

a unit bit pattern converter for keeping said unit code pattern and responsive to said unit shift register bit pattern for producing said unit converted bit;

a first additional bit pattern converter for keeping said first additional code pattern and responsive to said additional shift register bit pattern for producing an intermediate converted bit;

a modulo-two adder for calculating a sum modulo two of said intermediate converted bit and the encrypted bit produced by said adding means during said each clock period to produce an intermediate bit given by the sum calculated thereby;

a shift register responsive to the clock pulses supplied thereto as shift pulses for retaining, during each clock period, a preselected number of the intermediate bits successively produced by said adder to produce an auxiliary shift register bit pattern represented by the intermediate bits retained thereby; and a second additional bit pattern converter for keeping said second additional code pattern and responsive to said auxiliary shift register bit pattern for producing said at least one additional converted bit.

10. An encrypting device as claimed in claims 6, 7, 8, or 9, wherein said unit code pattern consists of binary bits, equal in number to $2^m$.

11. An encrypting device for encrypting a sequence of input data digits into a sequence of encrypted digits in response to a sequence of clock pulses timing said input data digits and said encrypted digits with a predetermined clock period, each input data digit comprising a first and a second input data bit, each encrypted digit comprising a first and a second encrypted bit, said device comprising:

modulo-two adding means for calculating a first sum modulo two of each first input data bit and at least one keying bit to produce a sequence of the first encrypted bits with each first encrypted bit given by said sum, a second sum modulo two of each second input data bit, said at least one keying bit, each first encrypted bit, and a first and a second adding means input bit to produce a sequence of the second encrypted bits with each second encrypted bit given by said second sum, and a third and a fourth sum modulo two of each first encrypted bit and said first and said second adding means input bits to produce a first and a second adding means output bit given by said third and said fourth sums, respectively;

shift register means responsive to the clock pulses supplied thereto as shift pulses for retaining, during each clock period, a predetermined number m of the second encrypted bits, a first prescribed number $m_1$ of the first adding means output bits successively produced by said adding means, and a second prescribed number $m_2$ of the second adding means output bits successively produced by said adding means to produce a unit and a first and a second additional shift register bit pattern represented by the m second encrypted bits and the $m_1$ first and the $m_2$ second adding means output bits retained therein, respectively;

bit pattern converting means responsive to a unit and a first and at least one second code pattern for converting said unit and said first and said second additional shift register bit patterns to a unit and a first and at least one second additional converted bit, respectively, said bit pattern converting means storing a code pattern including information bits at predetermined bit positions in said code pattern, other and remaining bits in said code pattern being determined by said stored information bits; and means for supplying said unit and said first and said at least one second additional converted bits to said adding means as said first and said second adding means input bits and said at least one keying bit, respectively.

12. An encrypting device as claimed in claim 11, wherein said unit and said first and said at least one second code patterns consist of binary bits, equal in number to $2^m$, $2^{m_1}$, and $2^{m_2}$, respectively.

13. A decrypting device for decrypting a sequence of receive encrypted bits into a sequence of decrypted bits, said sequence of receive encrypted bits being substantially identical with a sequence of original encrypted bits produced by an encrypting device in response to a sequence of input data bits and a sequence of encryption clock pulses timing said input data bits and said original encrypted bits with a predetermined encryption clock period, said encrypting device comprising encryption memory means responsive to the clock pulses for memorizing a predetermined number m of the original encrypted bits during each clock period to produce an encryption memory output bit pattern represented by the m original encryption bits memorized therein, encryption bit pattern converting means responsive to at least one code pattern for converting said memory output bit pattern to at least one encryption keying bit, and encryption modulo-two adding means for calculating a sum modulo two of each input data bit and said at least one keying bit to produce said sequence of original encrypted bits with each original encrypted bit given by said sum, said decrypting device being responsive to a sequence of local clock pulses timing said receive encrypted bits and said decrypted bits with a local clock period equal to said predetermined encryption clock period and comprising:

decryption memory means responsive to said local clock pulses for memorizing m receive encrypted bits during each local clock period to produce a decryption memory output bit pattern represented by the m receive encrypted bits memorized therein;

decryption bit pattern converting means responsive to said at least one code pattern for converting said decryption memory output bit pattern to at least one decryption keying bit; and decryption modulo-two adding means for calculating a sum modulo two of each receive encrypted bit and said at least one decryption keying bit to produce said sequence of decrypted bits with each decrypted bit given by the sum calculated by said decryption adding means.

14. A decrypting device as claimed in claim 13, said encryption bit pattern converting means comprising means for keeping a unit code pattern as said at least one code pattern and responsive to said encryption memory output bit pattern for producing a unit encryption keying bit as said at least one encryption keying bit, wherein said decryption bit pattern converting means comprises means for keeping said unit code pattern as said at least one code pattern and responsive to said decryption memory output bit pattern for producing a unit decryption keying bit as said at least one decryption keying bit.

15. A decrypting device as claimed in claim 13, said encryption bit pattern converting means comprising means for keeping a preselected number s of unit code patterns as said at least one code pattern and responsive to said encryption memory output bit pattern for substantially simultaneously producing s encryption keying bits as said at least one encryption keying bit, wherein said decryption bit pattern converting means comprises means for keeping said s unit code patterns as said at least one code pattern and responsive to said decryption memory output bit pattern for substantially simultaneously producing s decryption keying bits as said at least one decryption keying bit.

16. A decrypting device as claimed in claims 13, 14, or 15, wherein said at least one code pattern consists of binary bits, equal in number to $2^m$.

17. A decrypting device as claimed in claim 13, said encryption memory means comprising an encryption shift register which has first through (m−1)-th and m-th encryption stages as counted from the stage supplied with each original encrypted bit from said encryption adding means and by which said encryption clock pulses are used as shift pulses, said first through said m−1)-th and said m-th stages simultaneously producing first through (m−1)-th and m-th encryption output signals collectively as said encryption memory output bit pattern, respectively, said encryption bit pattern converting means comprising an encryption bit pattern converter for keeping a $2^{m-1}$-bit code pattern and responsive to said first through said (m−1)-th output signals for producing a first encryption keying bit as one of said at least one encryption keying bit, and an encryption conductor responsive to said m-th output signal for producing a second encryption keying bit as another of said at least one encryption keying bit, said at least one code pattern being equivalent to two $2^m$-bit code patterns, one being given by a concatenation of two code patterns, each being identical with said $2^{m-1}$-bit code pattern, the other being given by a succession of binary zeros, $2^{m-1}$ in number, followed by binary ones, $2^{m-1}$ in number, wherein:

said decryption memory means comprises a decryption shift register which has first through $(m-1)$-th and m-th decryption stages as counted from the decryption stage supplied with each receive encrypted bit supplied also to said decryption adding means and by which said local clock pulses are used as shift pulses, said first through said $(m-1)$-th and said m-th decryption stages simultaneously producing first through $(m-1)$-th and m-th decryption output signals collectively as said decryption memory output bit pattern;

said decryption bit pattern converting means comprising:

a decryption bit pattern converter for keeping said $2^{m-1}$-bit code pattern and responsive to said first through said $(m-1)$-th decryption output signals for producing a first decryption keying bit as one of said at least one decryption keying bit; and a decryption conductor responsive to said m-th decryption output signal for producing a second decryption keying bit as another of said at least one decryption keying bit.

18. A decrypting device as claimed in claim 13, said at least one code pattern being at least two in number and given by a unit code pattern and at least one additional code pattern, said encryption bit pattern converting means comprising a unit encryption bit pattern converter for keeping said unit code pattern and responsive to said encryption memory output bit pattern for producing a converted encryption bit, an encryption modulo-two adder for calculating a sum modulo two of said converted bit and the original encrypted bit produced by said encryption adding means during said each encryption clock period to produce an encryption sum bit given by the sum calculated by said adder, encryption shift register means responsive to the encryption clock pulses supplied thereto as shift pulses for retaining, during each encryption clock period, a prescribed number m' of the sum bits successively produced by said adder to produce an encryption shift register bit pattern represented by the m' sum bits retained therein, and additional encryption bit pattern converting means responsive to said at least one additional code pattern for converting said encryption shift register bit pattern to said at least one encryption keying bit, wherein said decryption bit pattern converting means comprises:

a unit decryption bit pattern converter for keeping said unit code pattern and responsive to said decryption memory output bit pattern for producing a converted decryption bit;

a decryption modulo-two adder for calculating a sum modulo two of said converted decryption bit and the receive encrypted bit supplied also to said decryption adding means during said each local clock period to produce a decryption sum bit given by the sum calculated by said decryption adder;

decryption shift register means responsive to the local clock pulses supplied thereto as shift pulses for retaining, during each local clock period, m' decryption sum bits successively produced by said decryption adder to produce a decryption shift register bit pattern represented by the m' decryption sum bits retained therein; and additional decryption bit pattern converting means responsive to said at least one additional code pattern for converting said decryption shift register bit pattern to said at least one decryption keying bit.

19. A decrypting device as claimed in claim 13, said at least one code pattern being at least two in number and given by a unit code pattern and at least one additional code pattern, said at least one encryption keying bit consisting of a unit encryption keying bit and at least one additional encryption keying bit, said at least one decryption keying bit consisting of a unit decryption keying bit and at least one additional decryption keying bit, said at least one additional decryption keying bit being equal in number to said at least one additional encryption keying bit, said encryption bit pattern converting means comprising a unit encryption bit pattern converter for keeping said unit code pattern and responsive to said encryption memory output bit pattern for producing said unit encryption keying bit, encryption shift register means responsive to the encryption clock pulses supplied thereto as shift pulses for retaining, during each encryption clock period, a prescribed number m' of the unit encryption keying bits successively produced by said unit encryption bit pattern converter to produce an encryption shift register bit pattern represented by the m' unit encryption keying bits retained therein, and additional encryption bit pattern converting means responsive to said at least one additional code pattern for converting said encryption shift register bit pattern to said at least one additional encryption keying bit, wherein said decryption bit pattern converting means comprises:

a unit decryption bit pattern converter for keeping said unit code pattern and responsive to said decryption memory output bit pattern for producing said unit decryption keying bit;

decryption shift register means responsive to the local clock pulses supplied thereto as shift pulses for retaining, during each local clock period, m' unit decryption keying bits successively produced by said unit decryption bit pattern converter to produce a decryption shift register bit pattern represented by the m' unit decryption keying bits retained therein; and additional decryption bit pattern converting means responsive to said at least one additional code pattern for converting said decryption shift register bit pattern to said at least one additional decryption keying bit.

20. A decrypting device for decrypting a sequence of receive encrypted bits into a sequence of decrypted bits, said sequence of receive encrypted bits being substantially identical with a sequence of original encrypted bits produced by an encrypting device in response to a sequence of input data bits and a sequence of encryption clock pulses timing said input data bits and said original encrypted bits with a predetermined encryption clock period, said encrypting device comprising modulo-two encryption adding means for calculating a first encryption sum modulo two of each original encrypted bit and an encryption adding means input bit and a second encryption sum modulo two of each input data bit and at least one encryption keying bit to produce an encryption sum bit given by said first sum and said sequence of original encrypted bits with each original encrypted bit given by said second sum, encryption shift register means responsive to the encryption clock pulses supplied thereto as shift pulses for retaining, during each encryption clock period, a predetermined number m of the original encrypted bits and a prescribed number m' of the sum bits successively produced by said adding means to produce a unit and an additional encryption shift register bit pattern represented by the m original encrypted bits retained therein and the m' sum bits retained therein, respectively, encryption bit pattern converting means responsive to a unit code pattern for converting said unit shift register bit pattern to a unit converted encryption bit and responsive to at least one additional code pattern for converting said additional shift register bit pattern to at least one additional converted encryption bit, and feedback means for supplying said unit and said at least one additional converted encryption bits to said adding means as said adding means input bit and said at least one encryption keying bit, respectively, said decrypting device being responsive to a sequence of local clock pulses timing said receive encrypted bits and said decrypted bits with a local clock period equal to to said predetermined encryption clock period and comprising:

modulo-two decryption adding means for calculating a first decryption sum modulo two of each receive encrypted bit and a decryption adding means input bit and a second decryption sum modulo two of each receive encrypted bit and at least one decryption keying bit to produce a decryption sum bit given by said first decryption sum and said sequence of decrypted bits with each decrypted bit given by said second decryption sum;

decryption shift register means responsive to the local clock pulse supplied thereto as shift pulses for retaining, during each local clock period, m receive encrypted bits and m' decryption sum bits successively produced by said decryption adding means to produce a unit and an additional decryption shift register bit pattern represented by the m receive encrypted bits retained therein and the m' decryption sum bits retained therein, respectively;

decryption bit pattern converting means responsive to said unit code pattern for converting said unit decryption shift register bit pattern to a unit converted decryption bit and responsive to said at least one additional code pattern for converting said additional decryption shift register bit pattern to at least one additional converted decryption bit; and feedforward means for supplying said unit and said at least one additional converted decryption bits to said decryption adding means as said decryption adding means input bit and said at least one decryption keying bit, respectively.

21. A decrypting device as claimed in claim 20, said at least one additional code pattern being two in number and given by a first and a second additional code pattern, said encryption bit pattern converting means comprising a unit encryption bit pattern converter for keeping said unit code pattern and responsive to said unit encryption shift register bit pattern for producing said unit converted encryption bit, a first additional encryption bit pattern converter for keeping said first additional code pattern and responsive to said additional encryption shift register bit pattern for producing an intermediate converted encryption bit, a modulo-two encryption adder for calculating a sum modulo two of said intermediate converted encryption bit and the original encrypted bit produced by said encryption adding means during said each encryption clock period to produce an intermediate encryption bit given by the sum calculated thereby, an encryption shift register responsive to the encryption clock pulses supplied thereto as shift pulses for retaining, during each encryption clock period, a preselected number m" of the intermediate bits successively produced by said adder to produce an auxiliary encryption shift register bit pattern represented by the m" intermediate bits retained therein, and a second additional encryption bit pattern converter for keeping said second additional code pattern and responsive to said auxiliary shift register bit pattern for producing said at least one additional converted encryption bit, wherein said decryption bit pattern converting means comprises:

a unit decryption bit pattern converter for keeping said unit code pattern and responsive to said unit decryption shift register bit pattern for producing said unit converted decryption bit;

a first additional decryption bit pattern converter for keeping said first additional code pattern and responsive to said additional decryption shift register bit pattern for producing an intermediate converted decryption bit;

a decryption modulo-two adder for calculating a sum modulo two of said intermediate converted decryption bit and the receive encrypted bit supplied also to said decryption adding means during each local clock period to produce an intermediate decryption bit given by the sum calculated thereby;

a decryption shift register responsive to the local clock pulses supplied thereto as shift pulses for retaining, during each local clock period, m" intermediate decryption bits successively produced by said decryption adder to produce an auxiliary decryption shift register bit pattern represented by the m" intermediate decryption bits retained therein; and a second additional decryption bit pattern converter for keeping said second additional code pattern and responsive to said auxiliary decryption shift register bit pattern for producing said at least one additional converted decryption bit.

22. A decrypting device as claimed in claims 18, 19, 20, or 21, wherein said unit code pattern consists of binary bits, equal in number to $2^m$.

23. A decrypting device for decrypting a sequence of receive encrypted digits into a sequence of decrypted digits, said sequence of receive encrypted digits being substantially identical with a sequence of original encrypted digits produced by an encrypting device in response to a sequence of input data digits and a sequence of encryption clock pulses timing said input data digits and said original encrypted digits with a predetermined encryption clock period, each input data digit comprising a first and a second input data bit, each original encrypted digit comprising a first and a second original encrypted bit, each receive encrypted digit comprising a first and a second receive encrypted bit, said encrypting device comprising modulo-two encryption adding means for calculating a first encryption sum modulo two of each first input data bit and at least one encryption keying bit to produce a sequence of the first original encrypted bits with each first original encrypted bit given by said first sum, a second encryption sum modulo two of each second input data bit, said at least one keying bit, each first original encrypted bit, and a first and a second encryption adding means input bit to produce a sequence of the second original encrypted bits with each second original encrypted bit given by said second sum, and a third and a fourth encryption sum modulo two of each first original encrypted bit and said first and said second adding means input bits to produce a first and a second encryption adding means output bit given by said third and said fourth sums, respectively, encryption shift register means responsive to the encryption clock pulses supplied thereto as shift pulses for retaining, during each encryption clock period, a predetermined number m of the second original encrypted bits, a first prescribed number $m_1$ of the first adding means output bits successively produced by said adding means, and a second prescribed number $m_2$ of the second adding means output bits successively produced by said adding means to produce a unit and a first and a second additional encryption shift register bit pattern represented by the m second original encrypted bits and the $m_1$ first and the $m_2$ second adding means output bits retained therein, respectively, encryption bit pattern converting means responsive to a unit and a first and at least one second additional code pattern for converting said unit and said first and said second additional shift register bit patterns to a unit and a first and at least one second additional converted encryption bit, respectively, and feedback means for supplying said unit and said first and said at least one second additional converted bits to said adding means as said first and said second adding means input bits and said at least one keying bit, respectively, wherein said decrypting device is responsive to a sequence of local clock pulses timing said receive encrypted digits and said decrypted digits with a local clock period equal to said encryption clock period and comprises:

modulo-two decryption adding means for calculating a first decryption sum modulo two of each first receive encrypted bit and at least one decryption keying bit to produce a sequence of the first decrypted bits with each first decrypted bit given by said first decryption sum, a second decryption sum modulo two of each second receive encrypted bit, said at least one decryption keying bit, each first receive encrypted bit, and a first and a second decryption adding means input bit to produce a sequence of the second decrypted bits with each second decrypted bit given by said second decryption sum, and a third and a fourth decryption sum modulo two of each first receive encrypted bit and said first and said second decryption adding means input bits to produce a first and a second decryption adding means output bit given by said third and said fourth decryption sums, respectively;

decryption shift register means responsive to the local clock pulses supplied thereto as shift pulses for retaining, during each local clock period, m second receive encrypted bits, $m_1$ first decryption adding means output bits successively produced by said decryption adding means, and $m_2$ second decryption adding means output bits successively produced by said decryption adding means to produce a unit and a first and a second additional decryption shift register bit pattern represented by the m second receive encrypted bits and the $m_1$ first and the $m_2$ second decryption adding means output bits retained therein, respectively;

decryption bit pattern converting means responsive to said unit and said first and said at least one second additional code patterns for converting said unit and said first and said second additional decryption shift register bit patterns to a unit and a first and at least one second additional converted decryption bit, respectively; and feedforward means for supplying said unit and said first and said at least one second additional converted decryption bits to said decryption adding means as said first and said second decryption adding means input bits and said at least one decryption keying bit, respectively.

24. A decrypting device as claimed in claim 23, wherein said unit and said first and said at least one second additional code patterns consist of binary bits, equal in number to $2^m$, $2^{m_1}$, and $2^{m_2}$, respectively.

* * * * *